US012591127B2

(12) United States Patent
Salisbury et al.

(10) Patent No.: US 12,591,127 B2
(45) Date of Patent: *Mar. 31, 2026

(54) OPTICAL DATA INSERTION

(71) Applicant: Thermoteknix Systems Limited, Cambridge (GB)

(72) Inventors: Max Salisbury, Cambridge (GB); Richard S. Salisbury, Cambridge (GB)

(73) Assignee: Thermoteknix Systems Ltd., Cambridge (GB)

( * ) Notice: Subject to any disclaimer, the term of this patent is extended or adjusted under 35 U.S.C. 154(b) by 306 days.

This patent is subject to a terminal disclaimer.

(21) Appl. No.: 18/235,107

(22) Filed: Aug. 17, 2023

(65) Prior Publication Data

US 2024/0111144 A1    Apr. 4, 2024

(30) Foreign Application Priority Data

Oct. 4, 2022    (GB) ..................................... 2214581

(51) Int. Cl.
| | |
|---|---|
| *G02B 23/00* | (2006.01) |
| *F41G 1/393* | (2006.01) |
| *G02B 5/02* | (2006.01) |
| *G02B 7/02* | (2021.01) |
| *G02B 23/12* | (2006.01) |

(52) U.S. Cl.
CPC ........... *G02B 23/145* (2013.01); *F41G 1/393* (2013.01); *G02B 5/0252* (2013.01); *G02B 5/0278* (2013.01); *G02B 7/021* (2013.01); *G02B 7/023* (2013.01); *G02B 23/12* (2013.01)

(58) Field of Classification Search
CPC .. G02B 23/145; G02B 5/0252; G02B 5/0278; G02B 7/021; G02B 7/023; G02B 23/12; F41G 1/393
USPC ......................................................... 359/642
See application file for complete search history.

(56) References Cited

U.S. PATENT DOCUMENTS

| | | | |
|---|---|---|---|
| 4,076,978 A | 2/1978 | Brennan et al. | |
| 6,031,604 A | 2/2000 | Pniel | |
| 7,355,790 B1 | 4/2008 | Wagner et al. | |
| 2025/0060578 A1* | 2/2025 | Salisbury | ............... G02B 7/021 |

FOREIGN PATENT DOCUMENTS

GB            2472516 B        3/2015

OTHER PUBLICATIONS

Search Report dated Apr. 3, 2023, in connection with GB2214581.7.

* cited by examiner

*Primary Examiner* — William Choi
(74) *Attorney, Agent, or Firm* — Downs Rachlin Martin PLLC

(57) ABSTRACT

A viewer for an optical data insertion device and a combined system comprising a viewer and an optical data insertion device. The optical data insertion device comprising a projector operable to project a visible image and a light guiding device operable to direct light from the projector into the viewer. The viewer comprising an objective lens, an eyepiece lens and a diffuser screen provided between the objective lens and the eyepiece lens.

29 Claims, 5 Drawing Sheets

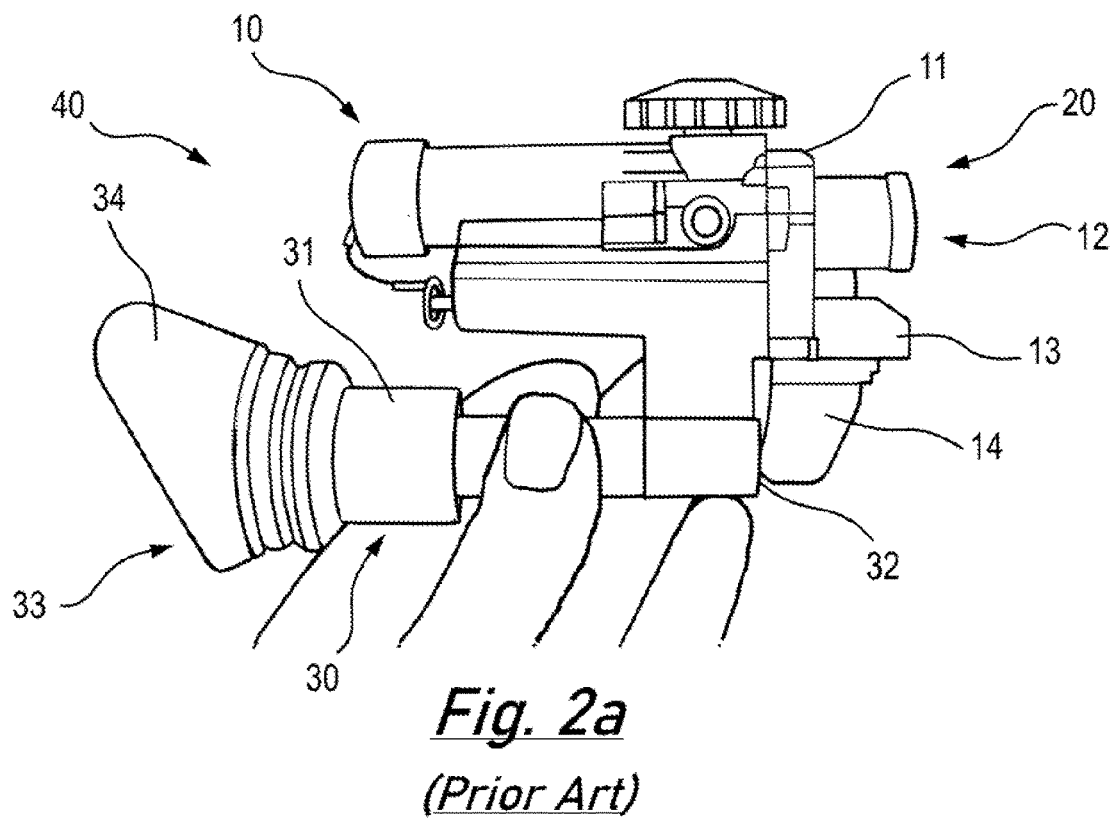
_Fig. 2a_
_(Prior Art)_

OPTICAL DATA INSERTION

RELATED APPLICATION DATA

This application claims the benefit of priority of UK Patent Application No. 2214581.7, filed on Oct. 4, 2022, and titled Optical Data Insertion, which is incorporated by reference herein in its entirety.

FIELD OF THE DISCLOSURE

The present invention relates to data insertion into an optical system. In particular, the present invention relates to a viewer for an optical data insertion device and to a combined system comprising a viewer and an optical data insertion device.

BACKGROUND

In certain circumstances it may be desirable to combine image information from two or more sources to provide a composite image. One such occasion is where it is desirable to provide text data (such as range or similar) over an image. Another such occasion is where it may be desirable to combine image data from different sources to provide an enhanced combined image.

An example of combining images is outlined in GB2472516A. In this document, an image intensifier is provided with an optical data insertion device in the form of a clip on attachment. The optical data insertion device comprises a thermal imager, a projector operable to project a visible image captured by the thermal imager and a light guiding device which directs light from the projector into the aperture of the image intensifier. In this manner light from the thermal imager and the image intensifier may be combined to provide a single image.

In order to provide optimal injection performance, the optical data insertion device must direct light into and along the optical axis of the aperture of the first device. In order to minimize the obstruction to the aperture, the light guiding device must be a thin as possible. This necessitates that the light guiding device has an exit aperture with a small numerical aperture (NA).

The above approach works well when optical data is injected into an image intensifier, partly because of the specific characteristics of tube-based intensifiers. The small NA is however problematic if it is desired to view the inserted optical data without an image intensifier for instance though a viewer device, sight or the like or (not recommended) by direct observation.

Typically, a user might seek to use a viewer device to enable inserted optical data to be overlaid on a visible scene. A viewer device offering reasonable eye relief might comprise an objective lens and an eyepiece lens. The objective lens can receive light from the light guiding device output aperture and thereby construct a real image within the viewer which is then presented as a virtual image to the eye via the eyepiece lens. The size of the virtual image of the injected data at the eye is determined by the effective aperture size and the magnification of the viewing system. For a system with unity magnification, the virtual image of the injected data is essentially the same size as the exit aperture of the light guiding device (~1 mm). Accordingly, the inserted data can only be seen if the eye and light guiding device are precisely aligned.

Prior art viewers do not permit incorporating a further optical device and may present an image of the light guiding device to the user.

It is therefore an object of the present invention to provide an optical device that at least partially overcomes or alleviates the above problems.

SUMMARY OF THE DISCLOSURE

According to a first aspect of the present invention there is provided a viewer device for use with an optical data insertion device of the type comprising a projector operable to project a visible image and a light guiding device operable to direct light from the projector into another optical device, the viewer device comprising: an objective lens, an eyepiece lens and a diffuser screen provided between the objective lens and eyepiece lens.

In the present invention, the diffuser screen re-emits or scatters the inserted light from a point in the real image constructed by the objective lens into a wide cone of light not dependent on the incoming angle. This effectively regenerates an expanded inserted image with a numerical aperture (NA) equivalent to the diffuser screen size rather than the exit aperture of the light guiding device. The diffuser screen image is thus visible over a wider viewing aperture than would be the case for the exit aperture of the light guiding device.

The diffuser screen may be provided at the real image plane of the objective lens. This limits distortion of the inserted optical data.

The diffuser screen may be provided within a field stop aperture. This prevents off axis rays from adversely impacting operation. The diffuser screen may be arranged substantially perpendicular to the optical axis of the viewer device.

The viewer device may be positioned relative to the light guiding device such that the light emitted from the light guiding device is directed substantially into the center of the objective lens and/or is substantially aligned with the optical axis of the viewer device. This limits the potential for clipping or distortion of the inserted optical data.

The diffuser screen may be highly transmissive. The diffuser screen may have a structure that is not visible to the human eye at the level of magnification provided by the eyepiece lens. This prevents the structure of the screen distracting a viewer from the inserted optical data.

The viewer device may have an overall magnification of the order of unity. In other embodiments, the viewer device may have an overall magnification selected to suit the specific requirements of the viewer device.

In one embodiment, the diffuser screen comprises a fibre bundle. The fibre bundle may comprise an array of optical fibres arranged such that the respective fibre ends are arranged in a common plane. Such fibre bundles may comprise of the order of, say, 10,000-100,000 individual fibres, with each individual fibre having a diameter of the order of 1 μm-100 μm. In such fibre bundles, light incident on one end of each fibre is subsequently re-emitted at the other end of the fibre, with relatively low loss. The angle of light re-emitted out of the fibre is strongly correlated to the incident angle, but randomly oriented to the fibre axis. Accordingly, such a screen may not be suitable for viewing at a significant distance, but given the practical considerations on the size of a viewer device, this drawback is not especially significant in the present invention.

The fibres comprising the fibre bundle may each have a diameter of, say, 4 μm or less. The fibres comprising the fibre bundle may each have a diameter of, say, 2.5 μm or less. In such fibre bundles, the fibres themselves are generally not evident even under magnification.

In another embodiment, the diffuser screen may comprise ground glass. Such screens comprise a glass pane wherein each surface has been ground by a suitable grit. The smooth surface of the glass thus has a disrupted structure, due to interaction with the grit in the grinding process. The disputed structure causes incident light to be refracted at a variety of different angles.

The characteristic size of the structural disruptions is related to the size of the of the grit particles used for grinding. As such, the structural disruption of the surface is typically defined in terms of the grit particle size used for grinding. The grit particle size may be in the range 120-600 grits. In some embodiments, the grit particle size may be greater than 600 grits. In the grit scale, higher grit equates to smaller particle size and hence less surface disruption. The coarseness of surface disruption (and hence the specific grit ground chosen) may depend on the specific device. Finer surface disruption provides less diffusion but also means that less of the surface disruption is visible under magnification. Coarser surface disruption improves diffusion but is more visible under magnification.

In another embodiment, the diffuser screen comprise a holographic diffuser. In further embodiments, the diffuser screen may comprise a micro-structure diffuser. Such diffusers are commonly used in combination with LED lighting units. In still further embodiments, the diffuser may comprise prismatic diffusers.

The viewer device may be provided within a housing. The housing may provide protection for the device as well as mounting for the lenses and screens. The housing may be opaque or substantially opaque. This can beneficially block the entry of unwanted light.

The housing may be elongate, the elongate axis coinciding with the optical axis of the viewer. The housing may be tubular or substantially tubular in form.

The objective lens may be provided within an inlet aperture. The inlet aperture may be provided at a first end of the housing. The eyepiece lens may be provided within an outlet aperture. The outlet aperture may be provided at a second end of the housing, distal to the first end. The outlet aperture may be provided with an eye guard. The eye guard may be wholly or partially resiliently deformable.

The housing may be provided with a mounting clip or adapted to receive a mounting clip. The clip can facilitate connection between the viewer device and another optical device, such as the optical data insertion device.

The objective lens may comprise one or more lens elements. The eyepiece lens may comprise one or more lens elements.

According to a second aspect of the present invention, there is provided an optical system comprising a viewer device according to the first aspect of the present invention and an optical data insertion device comprising a projector operable to project a visible image and a light guiding device operable to direct light from the projector into the viewer device.

The optical system according to the second aspect of the present invention may incorporate any or all features of the viewer device of the first aspect of the present invention, as required or as appropriate.

The viewer device may be positioned relative to the light guiding device such that the light emitted from the light guiding device is directed substantially into the center of the objective lens and/or is substantially aligned with the optical axis of the viewer device. This limits the potential for clipping or distortion of the inserted optical data.

The projector may be adapted to project an image captured by another imaging device. The other device may be a device adapted to capture an image in a different wavelength range. In this manner, the light guiding device may be used to generate composite images over an extended wavelength range. In one embodiment, the other imaging device may be operable to capture an infrared image.

In some embodiments, the intensity of light emitted by the projector may be variable. Varying the intensity of the light source emissions can reduce the possibility of the light source output swamping the other light incident on the inlet aperture of the viewer device. This can help to ensure that data from both the light source and the other light incident on the inlet aperture of the viewer device is clearly discernible by a user.

In some embodiments, the projector may be operable to invert optical data prior to projection. In this manner, the optical system can compensate for any image inversion characteristics of the viewer device.

The light guiding device may comprise an elongate light transmitting body, the body tapering from a wider end to a narrower end, the wider end adapted to provide a receiving surface for receiving incident light travelling in the first direction and the narrower end adapted to provide an exit aperture orientated to such that light exits the light guiding device in a second, different, direction. The elongate body may be narrow relative to the inlet aperture of the viewing device. The capture surface and/or the exit surface may be provided with one or more lenses adjacent thereto. At least the sides of the solid body may be covered by an opaque layer.

The optical data insertion device may comprise an internal power source. The internal power source may comprise a battery, which may be a rechargeable battery. Additionally or alternatively, the optical data insertion device may comprise a connection socket for an external power source.

The optical system may additionally comprise a further optical device aligned with the viewer device. In such embodiments, the further optical device and the viewer device may be mounted to a common structure. In such embodiments, the optical system and the further optical device may have fixed mounting position. Alternatively, the optical system and/or the further optical device may be mounted such that relative motion is possible. Typically, relative motion would be facilitated by rotating the optical system and/or the further optical device out of alignment. This permits a user to view through either the optical system or the further optical device as required or as desired. Accordingly, they may be mounted in line with a further optical device or mounted on a rotatable bracket which allows viewing separately either through the further optical device or through the optical data insertion device or can be rotated into an inclined position for combined viewing.

The further optical device may be aligned with and in front of the inlet aperture of the viewer device. In such cases, a user of the viewer device may view the further optical device through the viewer device. Alternatively, the further optical device may be aligned with and behind the outlet aperture of the viewer device. In such cases, a user of the viewer device may view the viewer device through the further optical device.

The further optical device may be a sight. The sight may be a weapon sight. The sight may be a reflector or reflex sight. In particular, the sight may comprise an illumination element. In some embodiments, the sight is a 'red dot' sight. Such sights are common to many weapons.

In some embodiments, an additional further optical device may be provided aligned with and in front of the inlet aperture of the viewer device or aligned with and behind the outlet aperture of the viewer device. In many such embodiments, the additional further optical device is provided at an opposing side of the viewer device to the further optical device. Examples of additional further optical devices may include magnifying lens assemblies or the like. As with the further optical device, the additional further optical device may be mounted in a fixed position relative to the further optical device and/or optical system or may be mounted such that relative motion is possible. Typically, relative motion would be facilitated by rotating the additional further optical device, the optical system and/or the further optical device out of alignment. This rotation may be facilitated by a rotational bracket. This permits a user to view through the additional further optical device, the optical system and/or the further optical device as required or as desired.

According to a third aspect of the present invention, there is provided a directional apparatus comprising an optical system according to the second aspect of the present invention.

The directional apparatus according to the third aspect of the present invention may incorporate any or all features of the optical system according to the second aspect of the present invention and/or the viewer device of the first aspect of the present invention, as required or as appropriate.

The directional apparatus may be any apparatus that is capable of being aimed or operating in a specific direction. For example, the directional apparatus may comprise a suitable sensing system, imaging system or camera, targeting device, weapon or the like. Suitable weapons may include guns, grenade launchers, rocket launchers and the like.

In some such embodiments, the directional apparatus may comprise an internal or external power source. The said power source may comprise a battery, which may be a rechargeable battery. In such cases, the directional apparatus may be operable to supply power to the optical data insertion device via a suitable connection socket and/or connection cable.

In some embodiments, an external power source for the optical system may be mounted to the directional apparatus. The said power source may comprise a battery, which may be a rechargeable battery.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIG. 2a is an illustration of an optical system comprising a prior art viewer device and an optical data insertion device of the type known from FIG. 1;

FIG. 5(a) illustrates a side view with the optical system in use, FIG. 5(b) is a side view with the optical system rotated away from use, FIG. 5(c) is a top view of the optical system rotated away from use and FIG. 5(d) is a front view the optical system rotated away from use.

DETAILED DESCRIPTION

Figure 1:
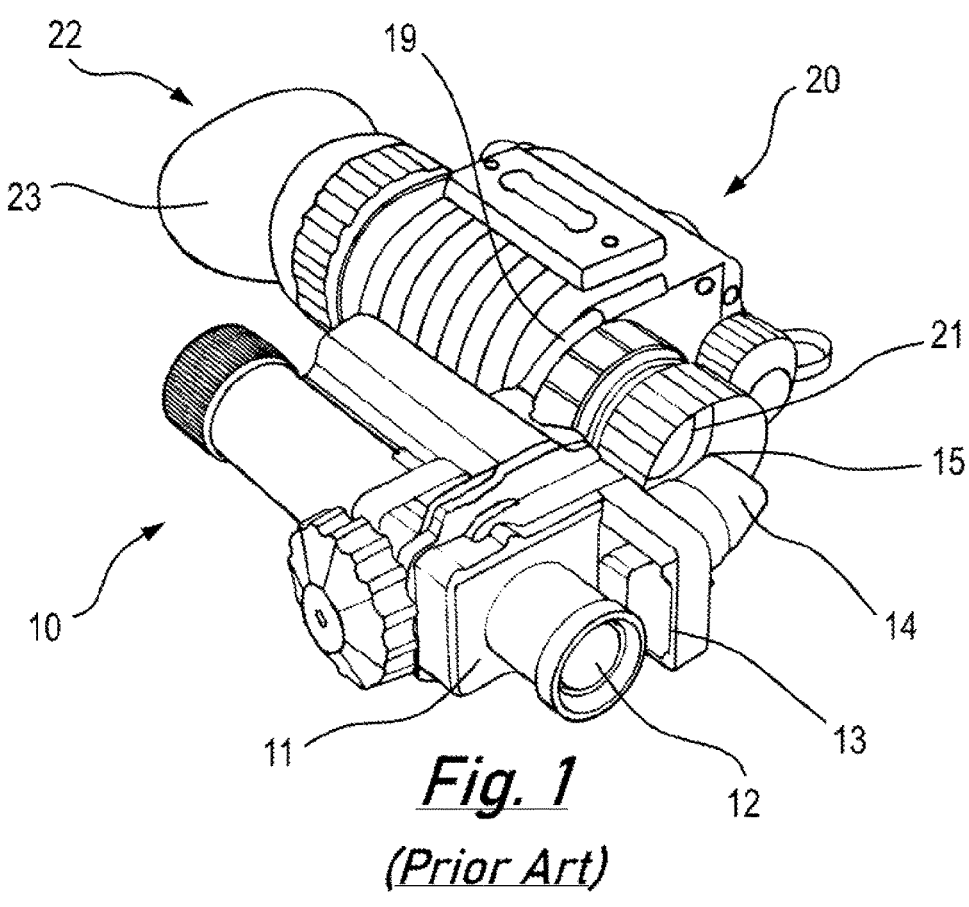
FIG. 1 is an illustration of an image intensifier provided with an optical data insertion device in the form of a clip on attachment, as known from the prior art.
Figure 5D:
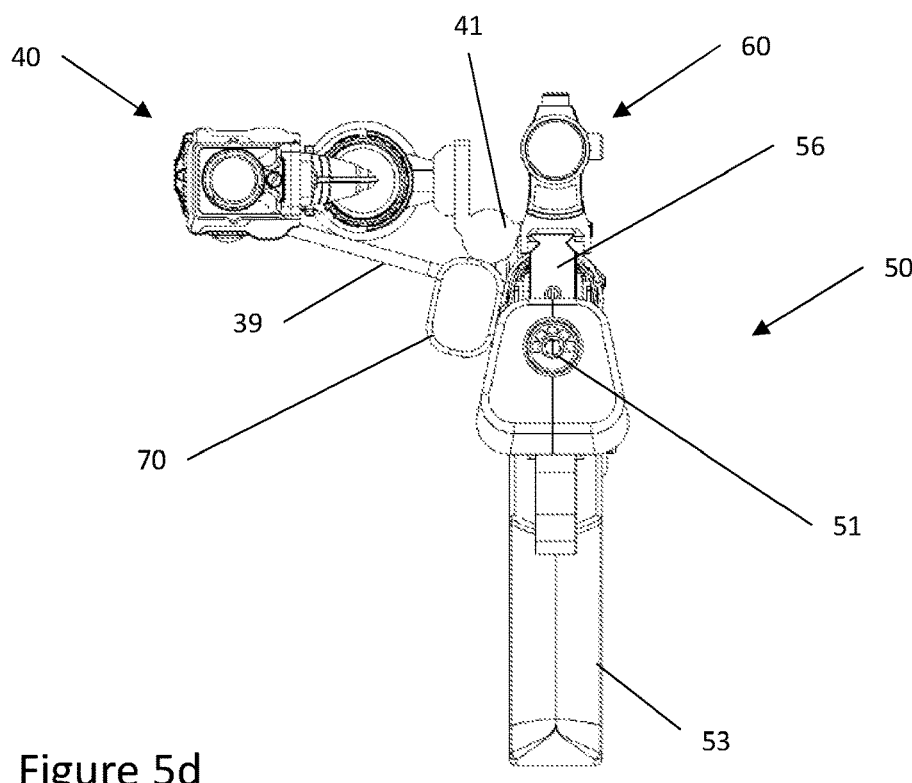
FIGS. 5(a), 5(b), 5(c) and 5(d) schematically illustrate another embodiment of an optical system according to the present invention rotatably mounted to a weapon behind a red dot sight, in particular

Turning to FIG. 1, an optical data insertion device 10 is used to inject optical data into an image intensifier 20. The optical data insertion device 10 can be secured to the image intensifier in use by any suitable means, including the clip 19 illustrated in FIG. 1. An example of such a system is described in more detail in GB2472516A. In summary, the optical data insertion device comprises a thermal imager 11 operable to capture a thermal image in response to infrared light incident on imaging aperture 12 and a projector 13 operable to project a visible image based on that captured by the thermal imager 12. In addition or alternatively, the projector 13 can project other data, for instance alphanumeric ranging data messages or the like. The optical data insertion device 10 further comprises a light guiding device 14.

The light guiding device 14 is adapted to direct light through an exit aperture 15 (not shown in FIG. 1) into and along the optical axis of the inlet aperture 21 of image intensifier 20. The light guiding device 14 is provided with an opaque housing and is constructed to be a thin as possible in order to minimize the obstruction to the inlet aperture 21. Accordingly, the image intensifier 20 will ultimately provide a combined image based on light from the environment incident on inlet aperture 21 and light from the light guiding device 14. The combined image is viewable though outlet aperture 22, which may be protected by an eye guard 23 as illustrated in FIG. 1.

In the example described in GB2472516A, the light guiding device 14 comprises an elongate light transmitting solid body, the body tapering from a wider end to a narrower end. The wider end is adapted to provide a receiving surface for receiving incident light, typically from the projector. The narrower end is adapted to provide an exit surface for said incident light and a reflector is provided adjacent to the narrower end, the reflector adapted to receive said incident light from the exit surface and reflect said incident light through the exit aperture 15. In view of the constrictions on the dimensions of the light guiding device 14, the exit aperture 15 of the light guiding device 14 necessarily is relatively small and hence has a small numerical aperture (NA).

Given the relatively convenient size and weight of the optical data insertion device 10, there is a desire to use the optical data insertion device 10 without the image intensifier 20. Since it impractical to view the exit aperture 15 of the light guiding device 14 the optical data insertion device might typically be clipped to a viewer device 30 using clip 19.

FIG. 2a illustrates a prior art viewer device 30 comprising a substantially tubular housing 31 provided with an inlet aperture 32 at one end and an outlet aperture 33 at another end. The outlet aperture 33 may be provided with an eye guard 34. In use, the inlet aperture 32 is positioned adjacent to and aligned with the exit aperture 15 of the light guiding device 14. As with the example shown in FIG. 1, a light guiding device 14 that is a thin as possible is beneficial to minimize the obstruction to the inlet aperture 32.

Figure 2B:
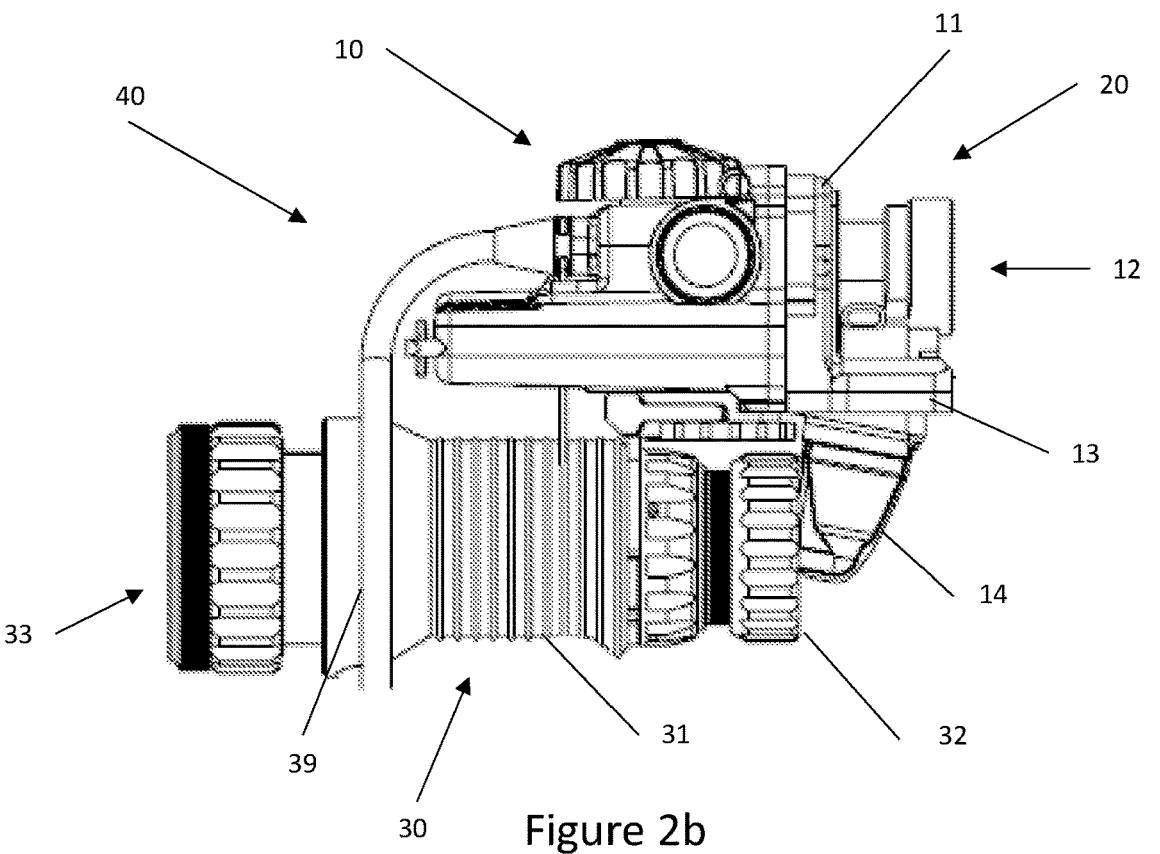
FIG. 2b is an illustration of an optical system comprising a viewer device according to the present invention and an optical data insertion device of the type known from FIG. 1.

FIG. 2b shows a viewer device 30 according to the present invention. The viewer device 30 of FIG. 2b is outwardly similar to the viewer device 30 of FIG. 2a. For example, the viewer device 30 of FIG. 2b comprises a substantially tubular housing 31 provided with an inlet aperture 32 at one end and an outlet aperture 33 at another end. In use, the inlet aperture 32 is positioned adjacent to and aligned with the exit aperture 15 of the light guiding device 14. As before, a light guiding device 14 that is a thin as possible is beneficial to minimize the obstruction to the inlet aperture 32. Unlike the optical data insertion device 10 of FIG. 2a, the optical data insertion device 10 of FIG. 2b is additionally provided with a cable 39 which can provide for an external power and/or data connection. The more important differences between the viewer devices 30 of FIGS. 2a and 2b are in the internal construction as illustrated in FIGS. 3a and 3b.

Figure 3A:
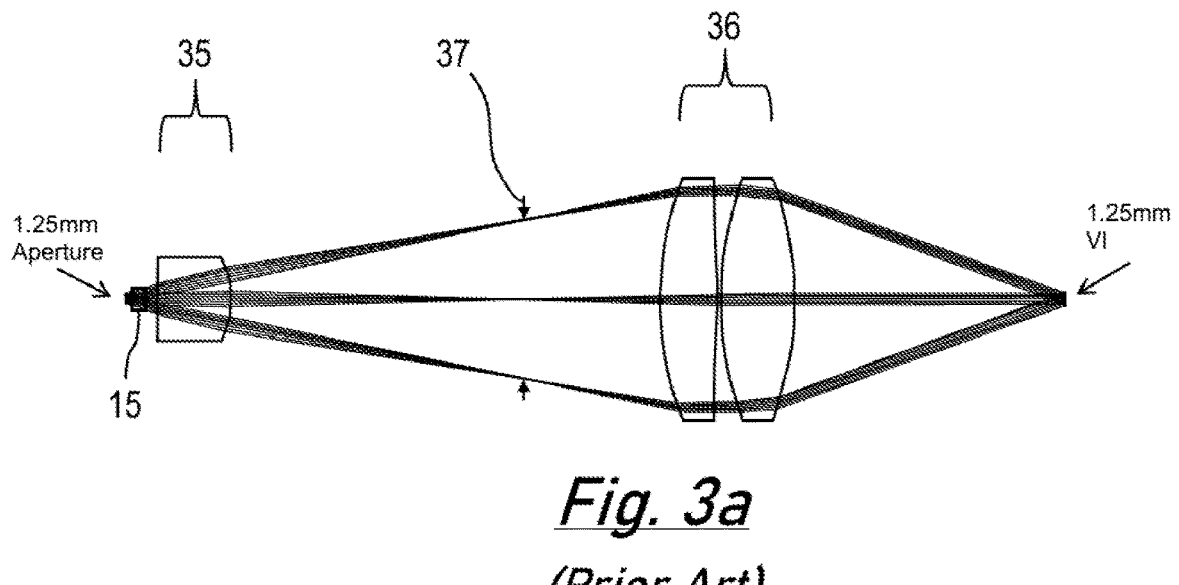
FIG. 3a is a schematic ray diagram illustrating the structure and operation of the prior art viewer device.
Figure 3B:
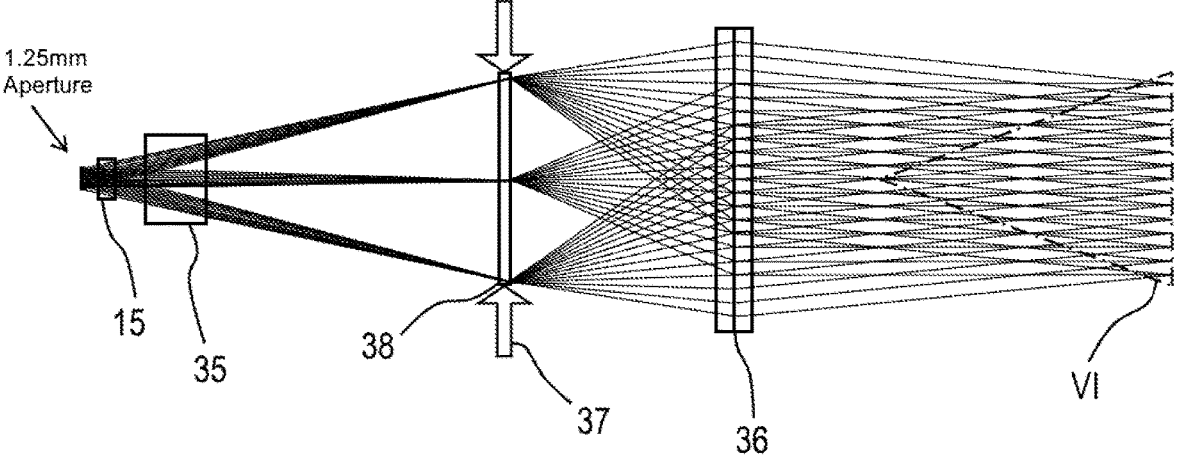
FIG. 3b is a schematic ray diagram illustrating the structure and operation of the viewer device according to the present invention.

Turning to FIG. 3a, a ray diagram illustrating the construction and operation of the prior art viewer device 30. The prior art viewer device 30 is provided with an objective lens 35 within the inlet aperture 32 and an eyepiece lens 36 provided within the outlet aperture 33. Each of the objective lens 35 and eyepiece lens 36 can be a single lens (as is the objective lens 35 of FIG. 3) or may be formed from multiple lens elements (as is the case with the eyepiece 36 lens of FIG. 3). A field stop aperture 37 may be provided so as to prevent off axis rays from adversely impacting operation.

In the prior art viewer device 30, the size of the virtual image VI at the eye is determined by the effective aperture size and the magnification of the objective lens 35 and eyepiece lens 36. For a system with unity magnification, the virtual image VI is essentially the same size as the exit aperture of the light guiding device (say ~1.25 mm as in FIG. 3). Accordingly, the inserted data can only be seen if the eye and light guiding device are precisely aligned.

In instances where the viewer device 30 inverts incident light, the projector 13 may be configured to invert projected data. This can compensate for the inversion applied by the viewer device 30.

Turning now to FIG. 3b, a ray diagram illustrating the construction and operation of a viewer device 30 according to the present invention is shown. The key difference is that the viewer device 30 of the present invention is provided with a diffuser screen 38. As shown in the example, the diffuser screen 38 is arranged substantially perpendicular to the optical axis of the viewer device 30. As illustrated in FIG. 3b, the diffuser screen 38 is provided within a field stop aperture 37 so as to prevent off axis rays from adversely impacting operation. The diffuser screen 38 is typically provided at the real image plane of the objective lens 35, so as to limit unwanted distortion of the inserted optical data.

In use, as is illustrated in FIG. 3b, the diffuser screen re-emits or scatters the inserted light from each point in the image into a wide cone of light not dependent on the incoming angle of the inserted light. This effectively regenerates an expanded input image with a numerical aperture (NA) equivalent to the size of the diffuser screen 38. The diffuser screen 38 image is thus larger and visible over a wider viewing aperture than would be the case for an image directly based on the exit aperture 15 of the light guiding device 14.

The diffuser screen 38 can optionally be of any suitable type or construction. For example, suitable diffuser screen 38 types/constructions include but are not limited to any one of fibre bundles, ground glass, holographic diffusers, micro-structure diffusers prismatic diffusers, louvres, and reflectors. In selecting a particular type and specification of diffuser screen 38, the skilled person will bear in mind that coarser diffuser structure provides enhanced diffusion performance, thereby increasing visibility of the virtual image VI but also increases distortion of the virtual image VI. Conversely, finer diffuser structure provides less diffusion and thus a less visible virtual image VI but also means that less of the surface disruption is visible under magnification.

Figures 4A, 4B, 4C:
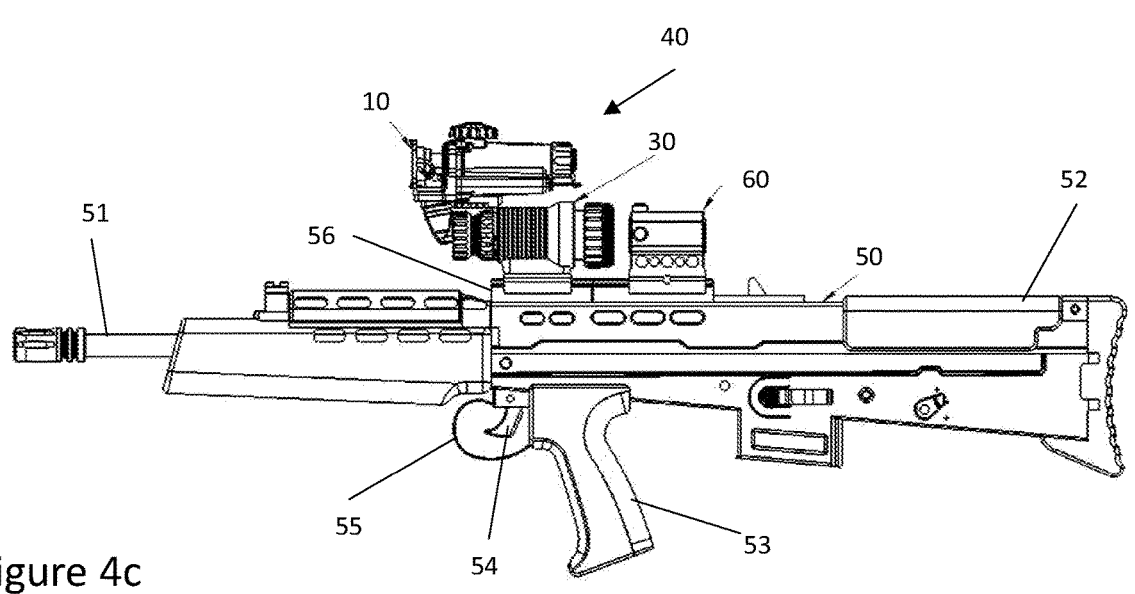
FIGS. 4(a), 4(b), and 4(c) schematically illustrate an optical system according to the present invention fitted to a weapon FIG. 4(a) in place of a sight, FIG. 4(b) behind a red dot sight, and FIG. 4(c) in front of a red dot sight.

Turning now to FIGS. 4(a)-4(c), examples of the viewer device 30 of the present invention used with the optical data insertion device 10 to provide an optical system 40 according to the present invention. As is illustrated in FIGS. 5(a)-5(d), the optical system 40 is used with a weapon 50. The skilled person will appreciate that the optical system 40 can equally be used with other directional apparatus for example, sensing systems, imaging systems or cameras, targeting devices or the like.

In the examples of FIGS. 4(a)-4(c), the weapon 50 is a rifle. In the example shown, the rifle 50 comprises barrel 51 at front end of the rifle 50 and a stock 52 at an opposing end of the rifle 50. Projecting from a lower side of the rifle 50 is a handle 53. Additionally projecting from the lower side of rifle 50 are trigger 54 and trigger guard 55. On an upper side of the rifle 50 is provided a mounting rail 56.

In FIG. 4a, the optical system 40 is fitted to mounting rail 56 and aligned with the barrel 51. Accordingly, the optical system 40 can function as a sight for rifle 50. In such cases, the user of rifle 50 can view an image in visible light of the target area for barrel 51 along with any information (such as an equivalent view in infrared) inserted via optical data insertion device 10.

Figure 5A:
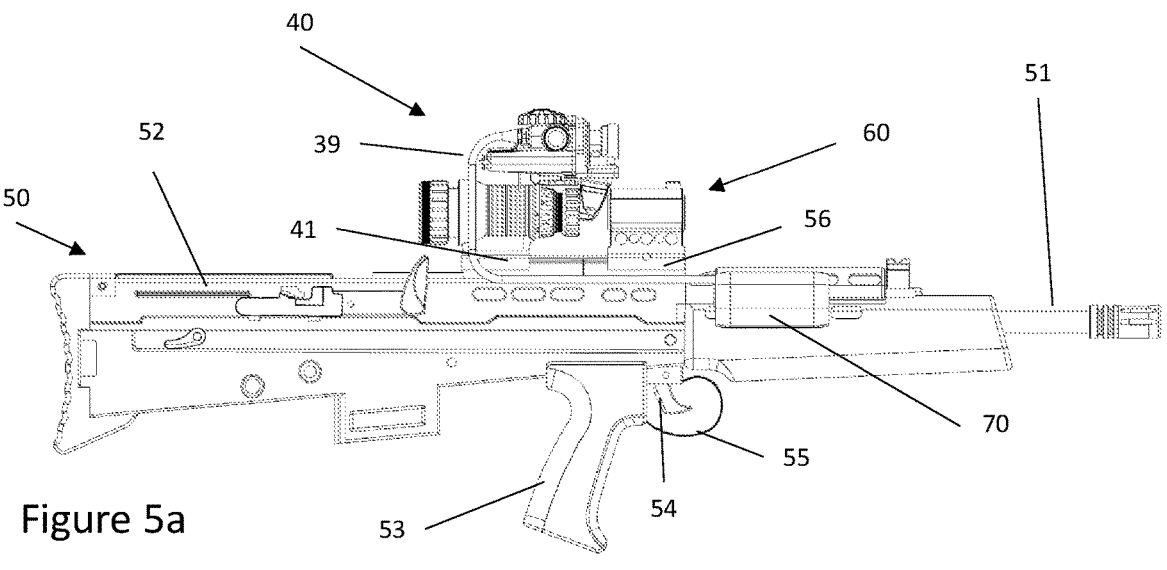

Turning now to FIG. 4b, the rifle 50 differs only from that of FIG. 5a in that a "red dot" type sight 60 is also fitted to the mounting rail 56. In this example, the in the red dot sight is positioned in front of the optical system 40 and aligned with the inlet aperture 32 of the viewer device 30. Accordingly, the optical system 40 can relay the view provided by red dot sight 60 to a user, including the red dot indicating alignment of the barrel 51. Additionally, any desired information (such as an equivalent view in infrared) can be inserted via optical data insertion device 10.

Figure 5B:
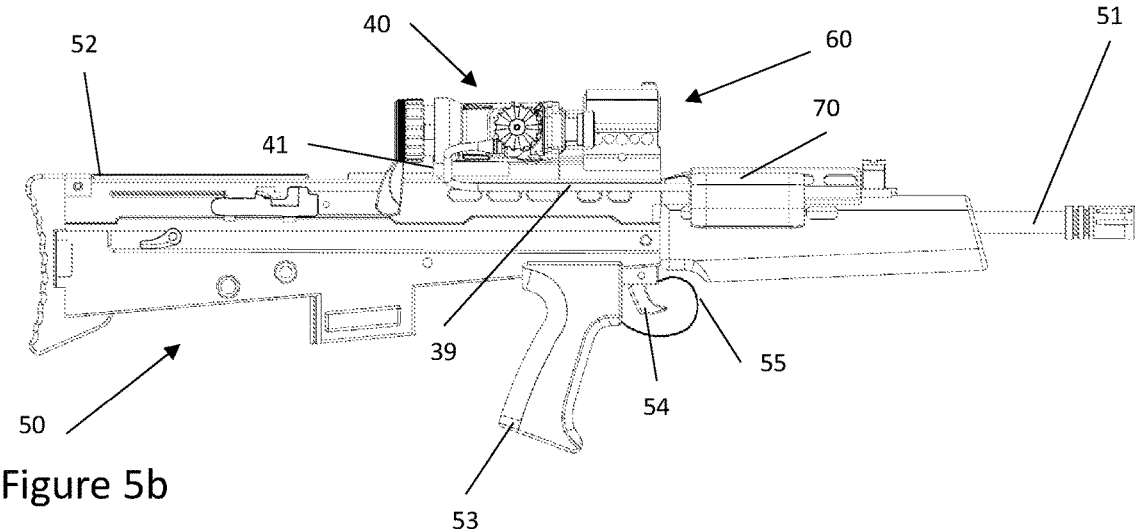
Figure 5C:
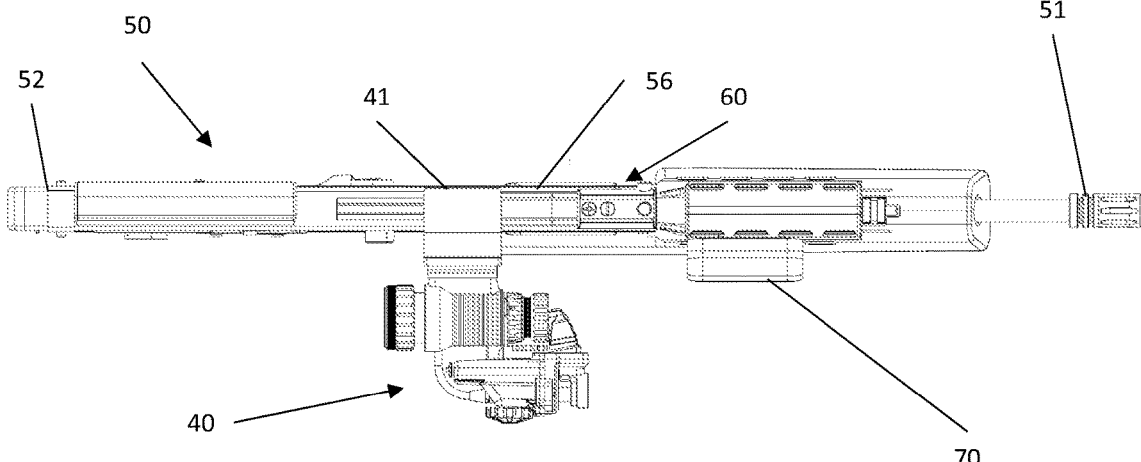

Turning now to FIG. 4c, this differs from FIG. 5b in that the red dot sight 60 is positioned behind rather than in front of the optical system 40 and aligned with the outlet aperture 33 of the viewer device 30. Accordingly, the red dot sight 60 relays the image in visible light of the target area viewable though the viewing device and any information (such as an equivalent view in infrared) inserted via optical data insertion device 10 to the user, overlaid with a red dot indicating alignment of the barrel 51.

The selection of whether to have red dot sight 60 in front of optical system 40 as in FIG. 4b or to have red dot sight 60 behind optical system 40 as in FIG. 4c, will depend on preference and/or intended operation.

Turning now to FIGS. 5(a)-5(d), this illustrates that the optical system 40 can be mounted to the rail 56 by way of a rotatable bracket. This allows the optical system 40 to be rotated relative to red dot sight 60 from an in use position in FIG. 5a to an out of use position shown in FIGS. 5b-5d. This can enable a user to rapidly switch between viewing through both the red dot sight 60 and optical system 40 or just the red dot sight 60.

The skilled person will appreciate that in alternative embodiments, the optical system 40 could rotate toward the other side of the weapon 50. The skilled person would also appreciate that the red dot sight 60 could be mounted to the rail 56 via a rotatable bracket. This might allow a user to rapidly switch between viewing through both the red dot sight 60 and optical system 40 or either device individually. Similarly, the skilled person will appreciate that the mounting position of red dot sight 60 and/or optical system 40 can be adjusted relative to each other along the axis of the weapon 50.

FIGS. 5(*a*)-5(*d*) further illustrate the provision of an external power source in the form of a battery 70 for the optical data insertion device 10. The battery can be mounted to the weapon 50 in a convenient location as shown in FIGS. 5(*a*)-5(*d*). The battery 70 can be connected to the optical data insertion device 10 by a power cable 39.

The skilled person will appreciate that in the examples of FIGS. 4(*a*)-4(*c*) and 5(*a*)-5(*d*), different weapons could be substituted for the rifle 50. Similarly, the skilled person will appreciate that other types of reflector or reflex sight may be substituted for a red dot sight where appropriate.

The one or more embodiments are described above by way of example only. Many variations are possible without departing from the scope of protection afforded by the appended claims.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. An optical system, comprising: a viewer device that includes and objective lens, an eyepiece lens, and a diffuser screen provided between the objective lens and eyepiece lens; and an optical data insertion device that includes: a projector operable to project a visible image; and a light guiding device operable to direct light from the projector into the viewer device.

2. The optical system of claim 1, wherein the diffuser screen is provided at the real image plane of the objective lens.

3. The optical system of claim 1, wherein the diffuser screen is provided within a field stop aperture.

4. The optical system of claim 1, wherein the diffuser screen is arranged substantially perpendicular to the optical axis of the viewer device.

5. The optical system of claim 1, wherein the diffuser screen has a structure that is not visible to the human eye at the level of magnification provided by the eyepiece lens.

6. The optical system of claim 1, wherein the diffuser screen comprises a fiber bundle.

7. The optical system of claim 6, wherein the fibers comprising the fiber bundle each have a diameter of 4 µm or less.

8. The optical system of claim 1, wherein the diffuser screen comprises ground glass.

9. The optical system of claim 8, wherein the grit particle size used for grinding the glass is in the range 120-600 grits or is greater than 600 grits.

10. The optical system of claim 1, wherein the diffuser screen comprises a holographic diffuser or a micro-structure diffuser.

11. The optical system of claim 1, wherein the viewer device is provided within a substantially tubular elongate and substantially opaque housing.

12. The optical system of claim 11, wherein the objective lens is provided within an inlet aperture at a first end of the housing and the eyepiece lens is provided within an outlet aperture at a second end of the housing, distal to the first end.

13. The optical system of claim 1, wherein the viewer device is positioned relative to the light guiding device such that the light emitted from the light guiding device is directed substantially into the center of the objective lens and/or is substantially aligned with the optical axis of the viewer device.

14. The optical system of claim 1, wherein the projector is adapted to project an image captured by another imaging device.

15. The optical system of claim 1, wherein the intensity of light emitted by the projector is variable.

16. The optical system of claim 15, wherein the elongate body is narrow relative to the inlet aperture of the viewing device.

17. The optical system of claim 1, wherein the light guiding device comprises an elongate light transmitting body, the body tapering from a wider end to a narrower end, the wider end adapted to provide a receiving surface for receiving incident light travelling in the first direction and the narrower end adapted to provide an exit aperture orientated to such that light exits the light guiding device in a second, different, direction.

18. The optical system of claim 1, wherein the optical system comprises a further optical device aligned with the viewer device.

19. The optical system of claim 18, wherein the further optical device and the viewer device are mounted to a common structure.

20. The optical system of claim 18, wherein the further optical device is aligned with and in front of the inlet aperture of the viewer device.

21. The optical system of claim 20, wherein the optical system and the further optical device are mounted such that relative motion is possible.

22. The optical system of claim 21, wherein relative motion is facilitated by rotating the optical system and/or the further optical device out of alignment.

23. The optical system of claim 18, wherein the further optical device is aligned with and behind the outlet aperture of the viewer device.

24. The optical system of claim 18, wherein the further optical device is a sight.

25. The optical system of claim 24, wherein the sight is a red dot sight.

26. The optical system of claim 18, wherein an additional further optical device may be provided aligned with and in front of the inlet aperture of the viewer device or aligned with and behind the outlet aperture of the viewer device.

27. A directional apparatus comprising an optical system according to claim 1.

28. The directional apparatus of claim 27, wherein the directional apparatus is a weapon.

29. The directional apparatus of claim 27, wherein an external power source for the optical system is mounted to the directional apparatus.

* * * * *